US009787521B1

(12) United States Patent
Boynes

(10) Patent No.: US 9,787,521 B1
(45) Date of Patent: Oct. 10, 2017

(54) CONCURRENT LOADING OF SESSION-BASED INFORMATION

(71) Applicant: AMAZON TECHNOLOGIES, INC., Reno, NV (US)

(72) Inventor: Jeremy Boynes, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 633 days.

(21) Appl. No.: 14/028,408

(22) Filed: Sep. 16, 2013

(51) Int. Cl.
*G06F 15/16* (2006.01)
*H04L 29/06* (2006.01)

(52) U.S. Cl.
CPC .............. *H04L 29/06326* (2013.01)

(58) Field of Classification Search
CPC ........ H04L 63/123; H04L 69/16; G06F 15/16
USPC ....................................... 709/227, 224, 200
See application file for complete search history.

(56) References Cited

U.S. PATENT DOCUMENTS

2008/0098122 A1* 4/2008 Metzger ............... H04L 63/123
709/229
2011/0145321 A1* 6/2011 Jiang ................. G06F 17/30902
709/203
2014/0108436 A1* 4/2014 Vishria ............. G06F 17/30867
707/754

OTHER PUBLICATIONS

NPL RFC 2616 (HTTP 1.1 spec, published in 1999), p. 23-24, section 3.6.1 Chunked Transfer Coding Network Working Group, R. Fielding http://www.rfc-base.org/txt/rfc-2616.txt.*

* cited by examiner

*Primary Examiner* — El Hadji Sall
(74) *Attorney, Agent, or Firm* — Lindauer Law, PLLC

(57) ABSTRACT

Techniques are described for determining non-session-related content of a web page through operations that are performed at least partly concurrently with operations for determining session-related content for the page. Session data may be stored on, or accessed through, a centralized session data service that is in communication with a plurality of content servers configured to serve web pages. To mitigate latency incurred through network communications between the content server(s) and the session data service, the generation or retrieval of non-session-related content may begin after the receipt of a page request in a session, and may proceed at least partly in parallel with operations to validate the session identifier, retrieve session data associated with the session identifier, or determine session-related content for the page based on the session data.

20 Claims, 12 Drawing Sheets

CONCURRENT LOADING OF SESSION-BASED INFORMATION

BACKGROUND

With the increasing number and variety of products available for purchase over the World Wide Web, more users are opting to purchase products and services online instead of patronizing more traditional, brick-and-mortar businesses. As network capacities and device capabilities improve, customers who shop online may come to expect faster presentation of content describing products and services of interest. In many cases, a delay in loading the content of a web page may lead to a potential customer growing impatient and navigating away from the site, resulting in lost business.

Figure 1:
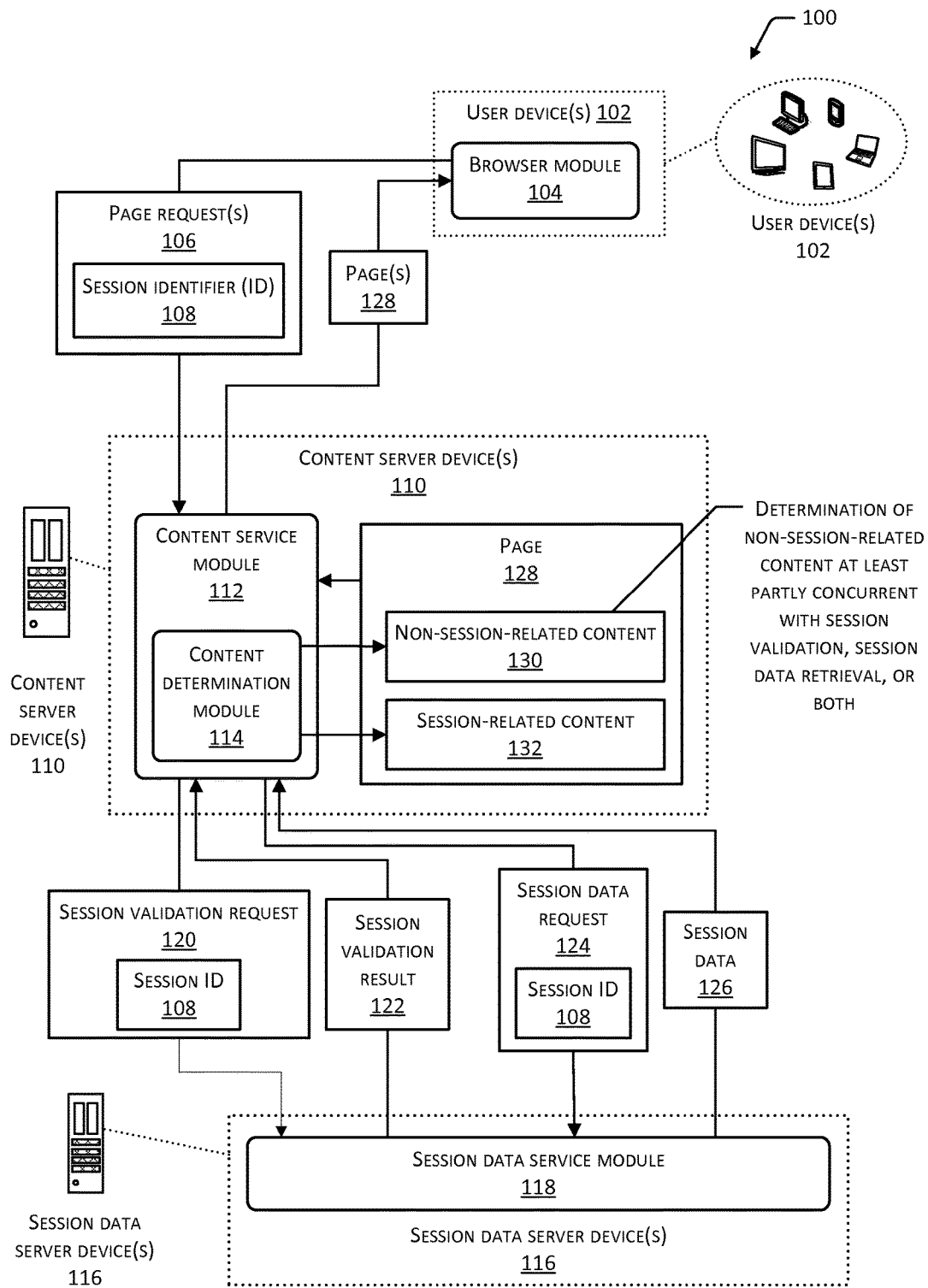
FIG. 1 depicts an environment for determining non-session-related content to present in a page, while concurrently performing operations to validate a session identified in the page request, to retrieve session data, and determine session-related content to present in the page.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for concurrently determining, loading, or otherwise processing non-session-related content and session-related content for a page, to potentially decrease the latency of providing a page in response to a page request. Web sites or other content delivery systems may support the use of a session to correlate multiple requests received from a same user, process, or device. An electronic commerce web site or other type of web site may designate a session for a user to enable information related to the user to be presented within multiple pages browsed by the user during the session. In some cases, a session may be tracked by associating a session identifier (ID) with requests for web pages, and with responses to the requests. Following a first request for a page of a web site, a session ID may be generated. The session ID may then be provided in the response to the first request as a cookie, a token, in the contents of the requested page, or in another form. The session ID may be stored by a browser or other user agent on the user device. Subsequent page requests may include the session ID either in the request itself, such as in a Uniform Resource Identifier (URI) specifying the page, or in a cookie sent with the request by a web browser or other user agent. After receiving the session ID with subsequent page requests, the web server may retrieve and load session-related information associated with the session ID. For example, an online retailer may employ a session to present, within multiple pages of a web site, information such as a shopping cart, browsing history, user identification information, or other information collected based on the user's interactions with the web site during a session.

In some cases, the session may be a Hypertext Transfer Protocol (HTTP) session in accordance with any version of HTTP, such that the session correlates multiple HTTP communications. However, implementations are not so limited, and other types of sessions are also supported. Accordingly, a session may describe a plurality of correlated communications or interactions between two or more communicating devices, users, or processes. A session ID may correspond to a particular session, and may in some cases uniquely identify a particular session. Implementations support session IDs of any data type, size, or format.

In some implementations, pages may include web pages that are described using any version of the Hypertext Markup Language (HTML), Dynamic HTML (DHTML), Extensible HTML (XHTML), Extensible Markup Language (XML), or other languages. Pages may include static content that is substantially constant across multiple requests for a page, dynamic content that may vary across multiple requests for a page, or any combination of static and dynamic content. For example, pages may include dynamic or rich content that is provided through the use of JavaScript files, Cascading Style Sheet (CSS) files, and so forth. Although examples herein may describe pages as web pages specified in HTML, JavaScript, CSS, and so forth, implementations are not so limited. Implementations support any type of page that includes any amount, type, or format of data. For example, implementations may support pages that include content described using Scalable Vector Graphics (SVG), Virtual Reality Modeling Language (VRML), and so forth. Pages may present any type of content, including but not limited to the following: formatted or unformatted text; numeric data of any type; multimedia content such as images, audio, video, graphics, or haptic output data; metadata; executable code such as JavaScript or CSS; and so forth.

In some cases, more than one server (e.g., web server) may be employed to service requests for pages (e.g., web pages included in a web site). In such cases, session data collected during one or more sessions may be stored on a data storage device or other computing device, such as a shared cache, a centralized session data server, or a centralized session data storage device. The device that stores session data may be remote (e.g., logically or physically remote) from the servers that are servicing requests for content. Accordingly, the network communications to retrieve session data from the remote, centralized session data storage may incur some amount of latency (e.g., delay) in processing and fulfilling requests for pages. To mitigate such latency, implementations provide a mechanism for determining, loading, or otherwise processing session-related content for a page concurrently with the processing of non-session-related content for the page. Concurrent operations described herein may include operations that are performed at least partly in parallel, such that the performance of the operations at least partly overlaps in time.

FIG. 1 depicts an environment 100 for determining non-session-related content to present in a page, while concurrently performing operations to validate a session identified in the page request, to retrieve session data, and determine session-related content to present in the page.

The environment 100 may include one or more user devices 102, which may be employed by one or more users to view or otherwise access information on a page such as a web page. The user device(s) 102 may comprise any type of computing device, including but not limited to a smartphone, a tablet computer, a wearable computer, an implanted computer, a mobile gaming device, an electronic book reader, an automotive computer, a desktop computer, a personal computer, a laptop computer, a thin client, a terminal, a game console, a smart appliance, a home entertainment device, and so forth.

The user device(s) 102 may execute a browser module 104. The browser module 104 may include any type of application configured to present content of a page. In some cases, the browser module 104 may be any type of web browser, including but not limited to the following: Mozilla® Firefox®, Microsoft® Internet Explorer®, Google® Chrome®, Apple® Safari®, Rockmelt®, Amazon® Silk®, and so forth. A user of the user device(s) 102 may employ the browser module 104 to generate a page request 106 for one or more pages such as a web page. The page request 106 may include an identification of the requested page, the identification being a URI, a Uniform Resource Locator (URL), a Uniform Resource Name (URN), an Internet Protocol (IP) address, a file or directory path, or another indication of a network location. In cases where the page request 106 is associated with an established session, the page request 106 may include a session ID 108 that identifies the session. In cases where the page request 106 is outside a session, or where a session has not yet been established (e.g., where the page request 106 is a first page request to a web site), the page request 106 may omit the session ID 108. Establishment of a session is described further with reference to FIG. 5.

The user device(s) 102 may communicate the page request 106 to one or more content server device(s) 110. The content server device(s) 110 may include any type of computing device, including but not limited to a server computer, personal computer, network computer, cloud computing or distributed computing device, any of the types of computing devices described with reference to the user device(s) 102, or other types of computing devices. An example of the content server device(s) 110 is described further with reference to FIG. 3. The content server device(s) 110 may include any type of server in any location with reference to a network topology. For example, the content server device(s) 110 may include a backend server, a primary server, a secondary server, a mid-tier server, an intermediate server, an edge server, and so forth.

In some implementations, the content server device(s) 110 may execute a content service module 112. The content service module 112 may receive and analyze the page request 106 sent from the user device(s) 102. In some implementations, the content service module 112 may include software modules configured to process one or more page requests 106, and serve pages in response to the page request(s) 106. For example, the content service module 112 may include modules of a web server, an application server, or other types of software configured to serve content in response to the page request(s) 106. The content server device(s) 110 may also execute a content determination module 114. In some implementations, as in the example of FIG. 1, the content determination module 114 may execute as a sub-module, sub-component, or sub-process of the content service module 112. Alternatively, the content determination module 114 may execute separately from the content service module 112.

The content determination module 114 may perform operations to generate dynamic content to be served to the user device(s) 102 in one or more pages specified in the page request(s) 106. The content determination module 114 may also retrieve, from data storage, substantially static content to be served in response to the page request(s) 106. In some cases, the content determination module 114 may request content from content storage. Such content storage may comprise any number of data storage systems. Content storage may be local storage on the content server device(s) 110, remote data storage that is external to the content server device(s) 110, or both local and remote data storage. In cases where the content determination module 114 dynamically generates content in response to the page request(s) 106, the dynamically generated content may be cached in memory on the content server device(s) 110 and used to fulfill subsequent page requests 106. The content determination module 114 may also locally cache substantially static content that has been retrieved from a remote content storage system.

The content server device(s) 110 may communicate over one or more networks with one or more session data server device(s) 116. The session data server device(s) 116 may include any type of computing device, including but not limited to any of the types of computing devices described above with reference to the user device(s) 102 or the content server device(s) 110. An example of the session data server device(s) 116 is described further with reference to FIG. 4.

The session data server device(s) 116 may execute a session data service module 118. The session data service module 118 may be configured to access session data that has been previously generated and stored during one or more sessions in which one or more users interact with one or more web sites provided by the content server device(s) 110. Such session data may be stored locally in memory on the session data server device(s) 116. Alternatively, session data may be stored remotely on a data storage system that is accessible to the session data service module 118 over one or more networks. In some cases, the session data service module 118 may execute on the content server device(s) 110. In such cases, any delay in page request processing that is introduced by retrieving session-related information from the (e.g., local) session data service module 118 may be mitigated through the implementations described herein.

On receiving the page request 106 that includes the session ID 108, the content service module 112 may validate the session ID 108 to ensure that the session ID 108 corresponds to a valid session. To validate the session ID 108, the content service module 112 may send a session validation request 120, including the session ID 108 to the session data service module 118. The session data service module 118 may examine the session data in view of the session ID 108, and determine whether any session data has been stored corresponding to the session ID 108. In some implementations, the session data service module 118 may further examine an expiry date/time associated with the session data to determine whether the session corresponding to the session ID 108 has timed out or expired. Based on this analysis of the session data, the session data service module 118 may generate a session validation result 122 that is communicated to the content service module 112. The session validation result 122 may indicate whether there is a valid session (e.g., an existing and non-expired session) corresponding to the session ID 108. In some cases, the session validation result 122 may be a binary answer (e.g., yes or no) to the question of whether there is a valid session corresponding to the session ID 108. Session validation is described further with reference to FIG. 6.

If the session validation result 122 indicates that there is a valid session corresponding to the session ID 108, the content service module 112 may send a session data request 124, including the session ID 108, to the session data service module 118. The session data request 124 may request at least a portion of session data 126 associated with the session ID 108. In some cases, the session data request 124 may request all the session data 126 that has been collected and stored during the particular session corresponding to the session ID 108. Alternatively, one or more session data requests 124 may be sent to request one or more particular attributes, data records, or elements of the session data 126. The session data 126 may be sent to the content service module 112. The session data 126 may be employed to generate a page 128 to be sent to the user device(s) 102 in response to the page request 106.

As described further with reference to FIGS. 5-9, after receiving the page request 106 one or both of the content service module 112 and the content determination module 114 may begin one or more operations to determine non-session-related content 130 to include in the page 128. Non-session-related content 130 may include any content that is independent of the session identified by the session ID 108. Non-session-related content 130 may include content that is independent of the session identified by the session ID 108, but that may be dependent on another session. In some cases, the non-session-related content 130 may be independent of any session. On receiving the session data 126, one or both of the content service module 112 and the content determination module 114 may begin one or more operations to determine session-related content 132 to include in the page 128. The session-related content 132 may include any content that is at least partly dependent on the session data 126. In some cases, the session-related content 132 may include at least a portion of the session data 126 itself. Alternatively, the session-related content 132 may include content that is derived from or otherwise based on the session data 126.

The determination of the non-session-related content 130 may include dynamically generating the non-session-related content 130, retrieving substantially static non-session-related content 130, or determining both dynamic and static portions of non-session-related content 130 to include in the page 128. The determination of the session-related content 132 may include dynamically generating the session-related content 132, retrieving substantially static session-related content 132, or determining both dynamic and static portions of session-related content 132 to include in the page 128.

Because the non-session-related content 130 is independent of the particular session, implementations may begin determining the non-session-related content 130 prior to retrieval of the session data 126 from the session data server device(s) 116. Accordingly, the determination of the non-session-related content 130 may be at least partly concurrent with (e.g., performed in parallel with or overlapping in time with) the operations performed to validate the session ID 108, retrieve the session data 126, and determine the session-related content 132 based on the session data 126. After determining the non-session-related content 130 and the session-related content 132, both types of content may be incorporated into the page 128 which may then be sent to the user device(s) 102 to satisfy the page request 106. By concurrently determining the non-session-related content 130 while performing session-related data processing, implementations may reduce the time to generate the page 128 and therefore reduce the latency in providing the page 128 to the user device(s) 102 in response to the page request 106. Such reduced latency may at least partly offset the latency incurred through the network communications between the content server device(s) 110 and the session data server device(s) 116 to validate the session ID 108 and retrieve the session data 126.

In some implementations, the content server device(s) 110, the session data server device(s) 116, or both the content server device(s) 110 and the session data server device(s) 116 may include multiple such devices that operate in a group, cluster, cloud, or other arrangement. Such an arrangement may enable parallel processing, failover support, load balancing, resource sharing (e.g., pooling of memory, storage, and processing capacity), and so forth. For example, in some cases multiple content server devices 110 may share the load of receiving and processing a large number of page requests 106 for page(s) 128 in one or more web sites. To ensure that the session-related content 132 may be provided to users regardless of the particular content server device 110 that receives the page request 106, the multiple content server devices 110 may communicate with one or more (e.g., centralized) session data server devices 116 that store or have access to a common set of session data 126.

The various devices of the environment 100 may communicate with one another, or with other devices not shown in FIG. 1, using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between various devices may be encrypted or otherwise secured. For example, such communications may employ one or more public or private cryptographic keys, digital certificates, or other credentials supported by a security protocol such as any version of the Secure Socket Layer (SSL) or the Transport Layer Security (TLS) protocol.

Figure 2:
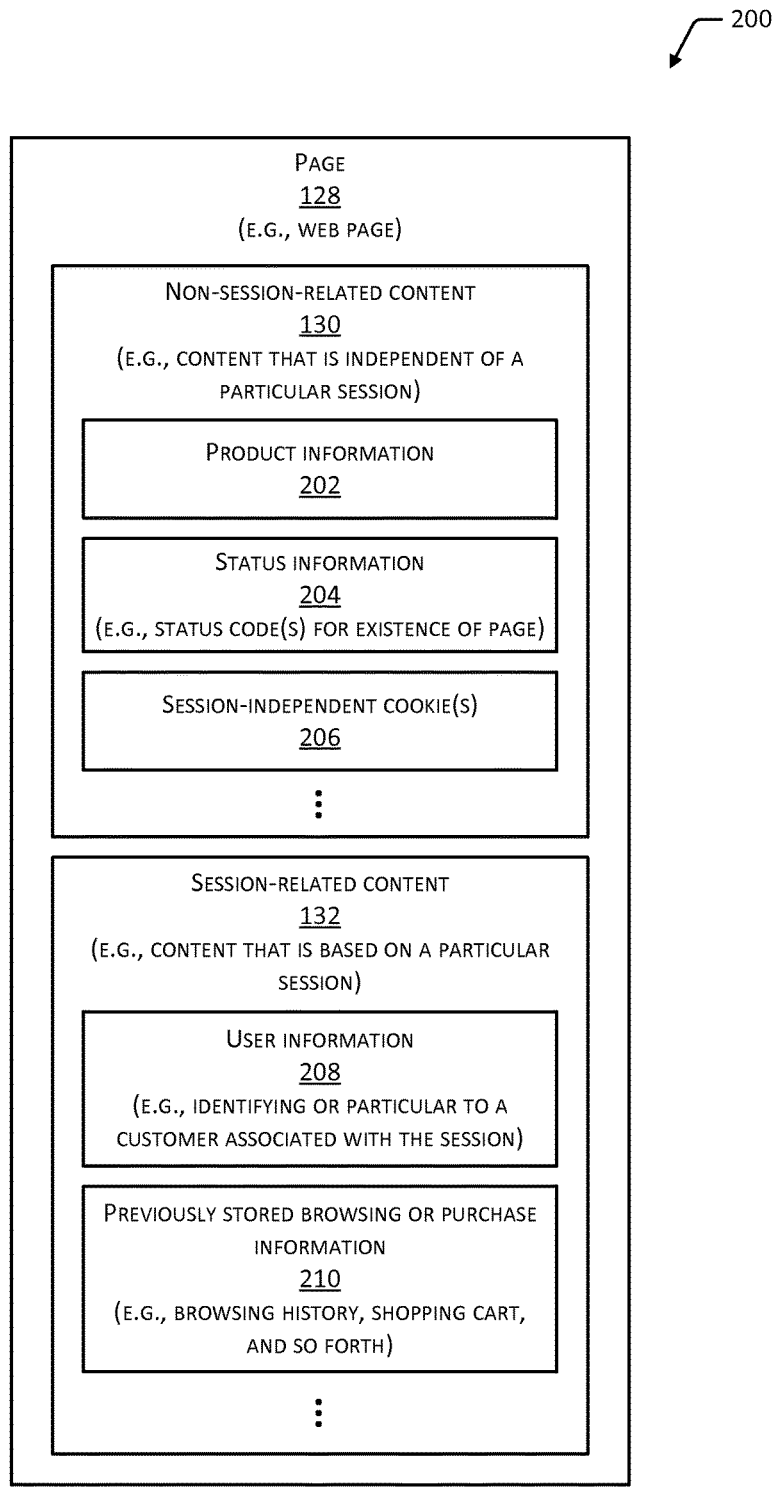
FIG. 2 depicts a schematic illustrating an example of a page that includes non-session-related content and session-related content.

FIG. 2 depicts a schematic 200 illustrating an example page 128 that includes non-session-related content 130 and session-related content 132. As described above, the non-session-related content 130 may include any content that is independent of a particular session. Such non-session-related content 130 may include dynamic content, which may be generated without knowledge of the session ID 108 or the session data 126. The non-session-related content 130 may also include substantially static content, which may be retrieved or otherwise accessed without knowledge of the session ID 108 or the session data 126.

As shown in the example of FIG. 2, the non-session-related content 130 may include product information 202. In cases where the content server device(s) 110 serve page(s) 128 for an electronic commerce web site, the page(s) 128 may include content describing products or services available through the web site. Such product information 202 may be substantially independent of the particular user or device interacting with the web site, and may therefore be substantially independent of any particular session. Accordingly, implementations may at least partly determine the product information 202 prior to or concurrently with session-related data processing.

Moreover, in some cases the non-session-related content 130 may include status information 204. The status information 204 may include status codes that indicate whether a page exists or whether a portion of a page exists, such as HTTP status codes 200 (e.g., page found), 404 (e.g., page not found), and others. The determination of status code(s) regarding the status of a page 128 (e.g., such as a detail page describing a product or service) may be substantially independent of the particular user or device requesting the page 128, and may therefore be substantially independent of any particular session. Implementations also support the determination of any type of status codes that indicate a status of the requested page 128, including but not limited to HTTP informational status codes 1xx, HTTP success status codes 2xx, HTTP redirection status codes 3xx, HTTP client error status codes 4xx, HTTP server error status codes 5xx, and so forth. In cases where the status code is a redirection status code, such that the browser module 104 or other user agent is to be redirected to another page, session-related processing for the current page 128 may be terminated.

In some cases an initial page request 106 may be a HTTP POST that includes, in its header, an "expect continue" notification indicating to the server that more information is forthcoming in a subsequent POST. The content server device 110 may respond with a "continue" status code 100, indicating that the user device 102 may send the subsequent request with the additional POST data. Such a status code may be incorporated into the non-session-related content 130, enabling the content server device 110 to receive and process the additional POST data concurrently with the session-related processing to retrieve the session data 126 and determine the session-related content 132. In some cases where the requested URI corresponds to a page 128 that accepts sensitive data (e.g., personal information, payment instrument identification, and so forth), the sending of the "continue" status code 100 may be delayed until validation of the session ID 108. In such cases if the session ID 108 is determined to be invalid, a "forbidden" status code 403 may be returned to instruct the browser module 104 not to send the sensitive data. Because status code determination may be independent of a particular session, implementations may at least partly determine the status information 204 prior to or concurrently with session-related data processing.

In some cases, the non-session-related content 130 may include one or more session-independent cookies 206. For example, in some cases one or more operations to determine whether a cookie is to be included in a response may proceed without knowledge of any particular session or session data 126. Accordingly, implementations may at least partly perform such operations to determine whether a cookie is to be included, prior to or concurrently with session-related processing. Moreover, in cases where the data in the cookie itself is session-independent, the operations to generate the cookie and incorporate it into the response may be performed concurrently with session-related data processing. Implementations also support other types of non-session-related content 130. Determination of the non-session-related content 130 is described further with reference to FIG. 8.

As shown in FIG. 2, the example page 128 may also include session-related content 132. As described above, the session-related content 132 may include any content that is at least partly dependent on, or at least partly based on, a particular session or session data 126. Such session-related content 132 may include dynamic content, which may be generated based on the session ID 108 or the session data 126. The session-related content 132 may also include substantially static content, which may be retrieved or otherwise accessed based on the session ID 108 or the session data 126. In some cases, at least a portion of the session data 126 may be incorporated into the page 128 as the session-related content 132.

For example, the session-related content 132 may include user information 208. The user information 208 may identify or describe a particular user involved in the session. In cases where the content server device(s) 110 serve page(s) 128 for an electronic commerce web site, the page(s) 128 may include a description, an identification, an image, or other information regarding the customer currently logged into and browsing the site. The session-related content 132 may also include previously stored browsing or purchase information 210, which may describe products or services previously browsed by the customer, purchased by the customer, placed by the customer into a shopping cart, saved or bookmarked by the customer, and so forth. Implementations also support other types of session-related content 132.

Figure 3:
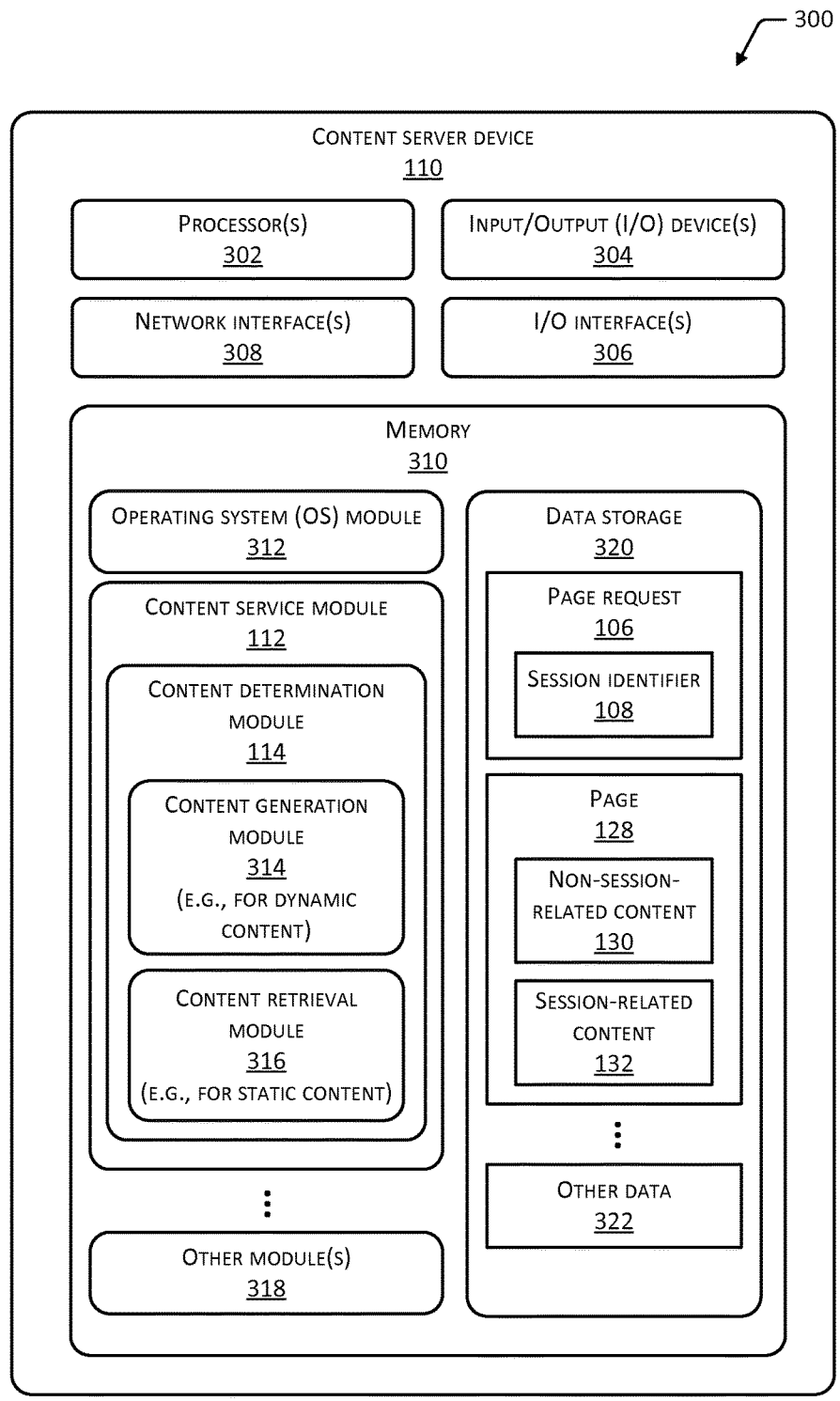
FIG. 3 depicts a block diagram of an example content server device configured to perform operations for determining non-session-related content while performing operations to validate a session and retrieve session data from a remote session data server device.

FIG. 3 depicts a block diagram 300 of an example of the content server device(s) 110. As shown in the block diagram 300, the content server device 110 may include one or more processors 302 configured to execute one or more stored instructions. The processor(s) 302 may comprise one or more cores.

The content server device 110 may include one or more input/output (I/O) devices 304. The I/O device(s) 304 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 304 may also include output devices such as a display, an audio output device (e.g., a speaker), a printer, a haptic output device, and so forth. The I/O device(s) 304 may be physically incorporated with the content server device 110, or may be externally placed.

The content server device 110 may include one or more I/O interfaces 306 to enable components or modules of the content server device 110 to control, interface with, or otherwise communicate with the I/O device(s) 304. The I/O interface(s) 306 may enable information to be transferred in or out of the content server device 110, or between components of the content server device 110, through serial communication, parallel communication, or other types of communication. For example, the I/O interface(s) 306 may comply with a version of the RS-232 standard for serial ports, or with a version of the Institute of Electrical and Electronics Engineers (IEEE) 1284 standard for parallel ports. As another example, the I/O interface(s) 306 may be configured to provide a connection over Universal Serial Bus (USB) or Ethernet. In some cases, the I/O interface(s) 306 may be configured to provide a serial connection that is compliant with a version of the IEEE 1394 standard. The content server device 110 may also include one or more busses or other internal communications hardware or software that allow for the transfer of data between the various modules and components of the content server device 110.

The content server device 110 may include one or more network interfaces 308 that enable communications between the content server device 110 and other networked devices, such as the session data server device(s) 116 and the user device(s) 102. The network interface(s) 308 may include one or more network interface controllers (NICs) or other types of transceiver devices configured to send and receive communications over a network.

The content server device 110 may include one or more memories, described herein as memory 310. The memory 310 comprises one or more computer-readable storage media (CRSM). The CRSM may include one or more of an electronic storage medium, a magnetic storage medium, an optical storage medium, a quantum storage medium, a mechanical computer storage medium, and so forth. The memory 310 provides storage of computer-readable instructions that may describe data structures, program modules, processes, or applications, and other data for the operation of the content server device 110.

The memory 310 may include an operating system (OS) module 312. The OS module 312 may be configured to manage hardware resources such as the I/O device(s) 304, the I/O interface(s) 306, and the network interface(s) 308, and to provide various services to applications, processes, or modules executing on the processor(s) 302. The OS module 312 may include one or more of the following: any version of the Linux® operating system; any version of iOS® from Apple Corp.® of Cupertino, Calif., USA; any version of Windows® or Windows Mobile® from Microsoft Corp.® of Redmond, Wash., USA; any version of Android® from Google Corp.® of Mountain View, Calif., USA and its derivatives from various sources; any version of Palm OS® from Palm Computing, Inc.® of Sunnyvale, Calif., USA and its derivatives from various sources; any version of BlackBerry OS® from Research In Motion Ltd.® of Waterloo, Ontario, Canada; any version of VxWorks® from Wind River Systems® of Alameda, Calif., USA; or other operating systems.

The memory 310 may include one or more of the modules described above as executing on the content server device(s) 110, such as one or both of the content service module 112 and the content determination module 114. In some cases, the content determination module 114 may include a content generation module 314 for dynamically generating content. The content determination module 114 may also include a content retrieval module 316 to retrieving substantially static content from local or remote content storage. The content generation module 314 and the content retrieval module 316 may execute as sub-modules of the content determination module 114 as shown. Alternatively, one or both of the content generation module 314 and the content retrieval module 316 may operate as separate modules from the content determination module 114. Operations of the content service module 112 and the content determination module 114 are described further with reference to FIGS. 5-9. The memory 310 may also include one or more other modules 318, such as a user authentication module or an access control module to secure access to the content server device 110, and so forth.

The memory 310 may include data storage 320 to store data for operations of the content server device 110. The data storage 320 may comprise a database, array, structured list, tree, or other data structure, and may be a relational or a non-relational datastore. The data storage 320 may store one or more of the page request 106, the session ID 108, or the page 128, including the non-session-related content 130 and the session-related content 132. The data storage 320 may also store other data 322, such as user authentication information or access control data. In some implementations, at least a portion of the information stored in the data storage 320 may be stored externally to the content server device 110, on other devices that are accessible to the content server device 110 via the I/O interface(s) 306 or via the network interface(s) 308.

Figure 4:
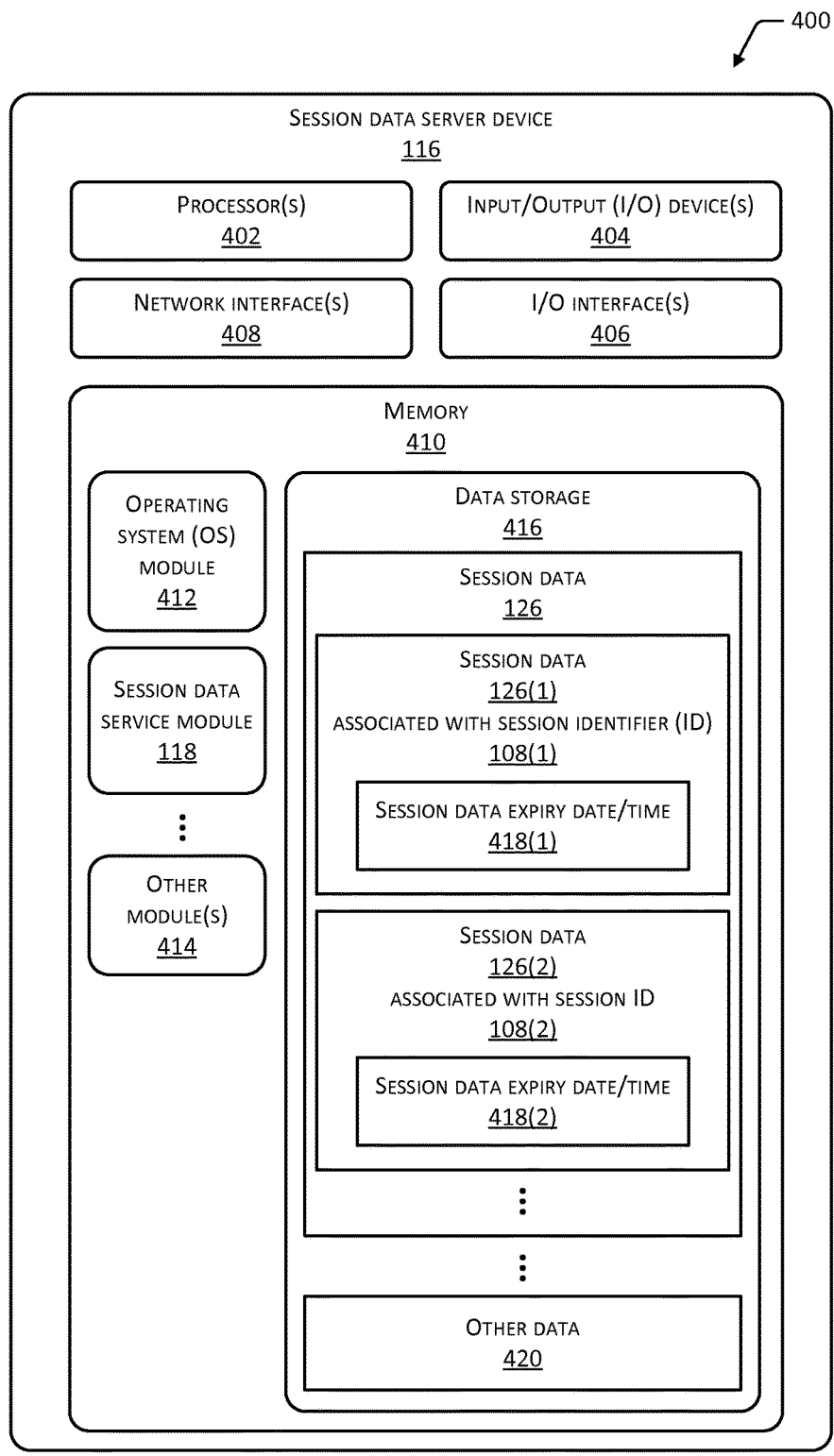
FIG. 4 depicts a block diagram of an example session data server device executing a session data service to provide session data.

FIG. 4 depicts a block diagram 400 of an example of the session data server device(s) 116. As shown in the block diagram 400, the session data server device 116 may include one or more processors 402 configured to execute one or more stored instructions. The processor(s) 402 may comprise one or more cores. The session data server device 116 may include one or more I/O devices 404, one or more I/O interfaces 406, and one or more network interfaces 408 as described above with reference to the I/O device(s) 304, the I/O interface(s) 306, and the network interface(s) 308 respectively.

The session data server device 116 may include one or more memories, described herein as memory 410. The memory 410 comprises one or more CRSM. The CRSM may include one or more of an electronic storage medium, a magnetic storage medium, an optical storage medium, a quantum storage medium, a mechanical computer storage medium, and so forth. The memory 410 provides storage of computer-readable instructions, data structures, program modules, and other data for the operation of the session data server device 116. The memory 410 may include an OS module 412. The OS module 412 may be configured to manage hardware resources such as the I/O device(s) 404, the I/O interface(s) 406, and the network interface(s) 408, and to provide various services to applications, processes, or modules executing on the processor(s) 402. The OS module 412 may include one or more of the operating systems described above with reference to OS module 312.

The memory 410 may include any of the modules described above as executing on the session data server device 116, such as the session data service module 118. The memory 410 may also include one or more other modules 414, such as a user authentication module or an access control module to secure access to the session data server device 116, and so forth.

The memory 410 may include data storage 416 to store data for operations of the session data server device 116. The data storage 416 may comprise a database, array, structured list, tree, or other data structure, and may be a relational or a non-relational datastore. The data storage 416 may store the session data 126. In some implementations, as in the example of FIG. 4, the session data 126 may be arranged into one or more portions that each include the session data 126 associated with a particular session ID 108 (e.g., for a particular session). Such an arrangement may comprise a tree, a list, a mapping, a table, a flat file, or any other data structure. In some cases, the session data 126 for a particular session ID 108 may be accessed by querying the session data 126 using the session ID 108 as a key value. In some implementations, a portion of the session data 126 associated with a particular session ID 108 may also include a session data expiry date/time 418, indicating a date, time, or a date and time when the session data 126 for the session ID 108 expires (e.g., times out). In this way, some implementations ensure that a session may not persist longer than a predetermined period of time from when the session was created or when the session was last specified by a user agent (e.g., browser module 104) in a page request 106.

The data storage 416 may also store other data 420, such as user authentication information or access control data. In some implementations, at least a portion of the information stored in the data storage 416 may be stored externally to the session data server device 116, on other devices that are accessible to the session data server device 116 via the I/O interface(s) 406 or via the network interface(s) 408.

Figure 5:
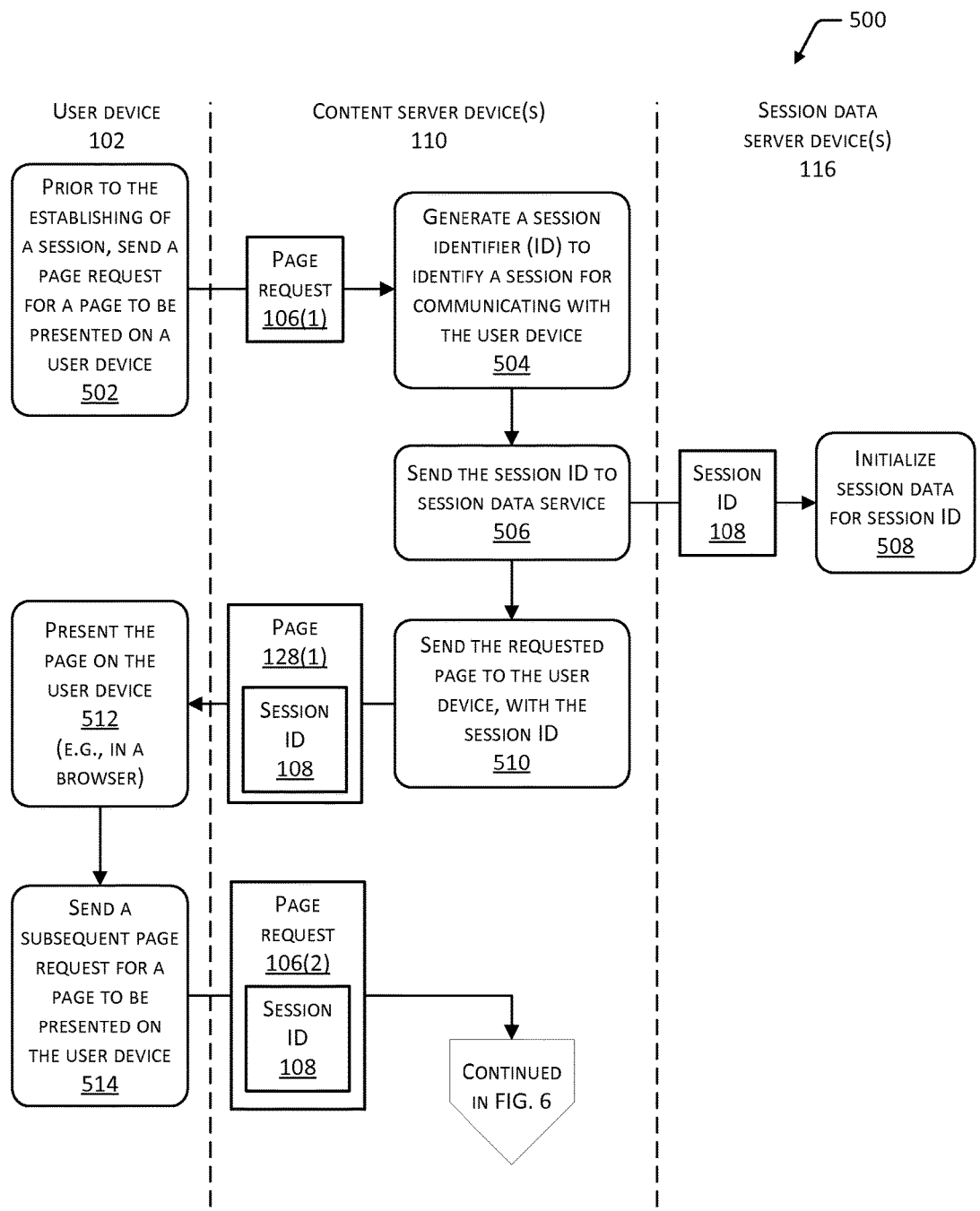
FIG. 5 depicts a flow diagram of a process for establishing a session for communicating with a user device, and receiving a page request that specifies the session.

FIG. 5 depicts a flow diagram 500 of a process for establishing a session for communicating with the user device 102. Operations of the process may be performed by the browser module 104 or other modules executing on the user device(s) 102. Operations of the process may be performed by the content service module 112, the content determination module 114, or other modules executing on the content server device(s) 110. Operations of the process may be performed by the session data service module 118 or other modules executing on the session data server device(s) 116. Operations of the process may also be performed by other modules of other devices.

At 502, a page request 106(1) may be sent from a user agent executing on the user device 102 (e.g., from the browser module 104) to the content server device(s) 110 (e.g., to the content service module 112). The page request 106(1) may be sent as an initial page request to a web site, such that a session has not yet been established for a current set of communications between the user device 102 and the content server device(s) 110. The page request 106(1) may request a particular page 128 to be presented on the user device 102 through the browser module 104 or other user agent.

At 504, the page request 106(1) is received at one of the content server device(s) 110, and a session ID 108 is generated to identify a session for communicating with the user device 102. In some cases, the session ID 108 may be generated using a random or pseudo-random number generation algorithm, and the session ID 108 may have a sufficient size to ensure that the generated session ID 108 is unique among session IDs 108 generated on multiple content server devices 110.

At 506, the session ID 108 may be sent to the session data service module 118 to register a new session. At 508, the session data service module 118 may receive the session ID 108 and initialize the session data 126 associated with the particular session ID 108. Such initialization may include allocating a portion of the session data 126 as the session data 126(1), initializing a data structure in which to store the session data 126(1) that may be collected during the session, and so forth. Initialization may also include setting the session data expiry date/time 418(1) to be a predetermined period of time from a current date/time.

In some implementations, the page request 106(1) may be analyzed to determine whether the page request 106(1) is likely to have been sent from a robot or some other automated process. Such analysis may employ heuristic or predictive algorithms to estimate a likelihood that the page request 106(1) is from an automated process. In cases where it is determined that the page request 106(1) is likely to have been sent by an automated process, a session ID 108 may be generated but the session data 126 may not be allocated or initialized for the session. Accordingly, session data 126 may not be stored for a session involving an automated process as a requestor. The analysis to identify an automated process may be performed on one or both of the content server device(s) 110 and the session data server device(s) 116.

At 510, the content server device(s) 110 may send to the user device 102 the page 128(1) requested in the page request 106(1), with the session ID 108. In some cases, the session ID 108 may be incorporated into a cookie (e.g., a HTTP cookie) that is provided with the page 128(1). Alternatively, the session ID 108 may be incorporated into a token along with other information, and the token may be provided with the page 128(1). The session ID 108 may also be incorporated into the contents of the page 128(1), such as in a header of the page 128(1). At 512, the page 128(1) may be presented on the user device 102, through the browser module 104 or other user agent. The session ID 108 may be stored in memory on the user device 102, by the browser module 104 or another user agent.

At 514, the user device 102 may send a subsequent page request 106(2) for a page 128(2) to be presented on the user device 102. The page request 106(2) may include the session ID 108, indicating that this subsequent page request 106(2) is part of the previously established session. In some cases, the page request 106(2) may include a cookie that includes the session ID 108. Alternatively, the session ID 108 may be included in the URI (e.g., a URL, a URN, or otherwise) that specifies the requested page 128(2). Implementations also support other methods by which the session ID 108 may be communicated in requests or responses. The processing of the page request 106(2) is described further with reference to FIG. 6.

In some implementations, on receiving the page request 106(1) that does not include session information (e.g., that does not include the session ID 108), the process may perform operations such as those described above to determine whether the user agent that sent the page request 106(1) is an automated process such as a robot. Because such operations may introduce latency, the process may serve a first (e.g., generic) version of the requested page 128 while the potentially delay-introducing robot detection operations are being performed on the content server device(s) 110, the session data server device(s) 116, or elsewhere. If it is determined that the user agent is not a robot, a second (e.g., richer) version of the requested page 128 may then be provided to the user device 102. In some cases, the first (e.g., generic) version of the requested page 128 may be a static page that is predetermined and retrieved from content storage. The second version of the requested page 128 may include a newly generated session ID 108, which may be provided in a HTTP cookie to the user device 102. In some cases, the HTTP cookie may be included in a HTTP trailer section of the page 128, as described below with reference to FIG. 12. Including the HTTP cookie in the trailer section may provide sufficient time for the robot detection operations to complete before delivering the HTTP cookie that includes the session ID 108.

Figure 6:
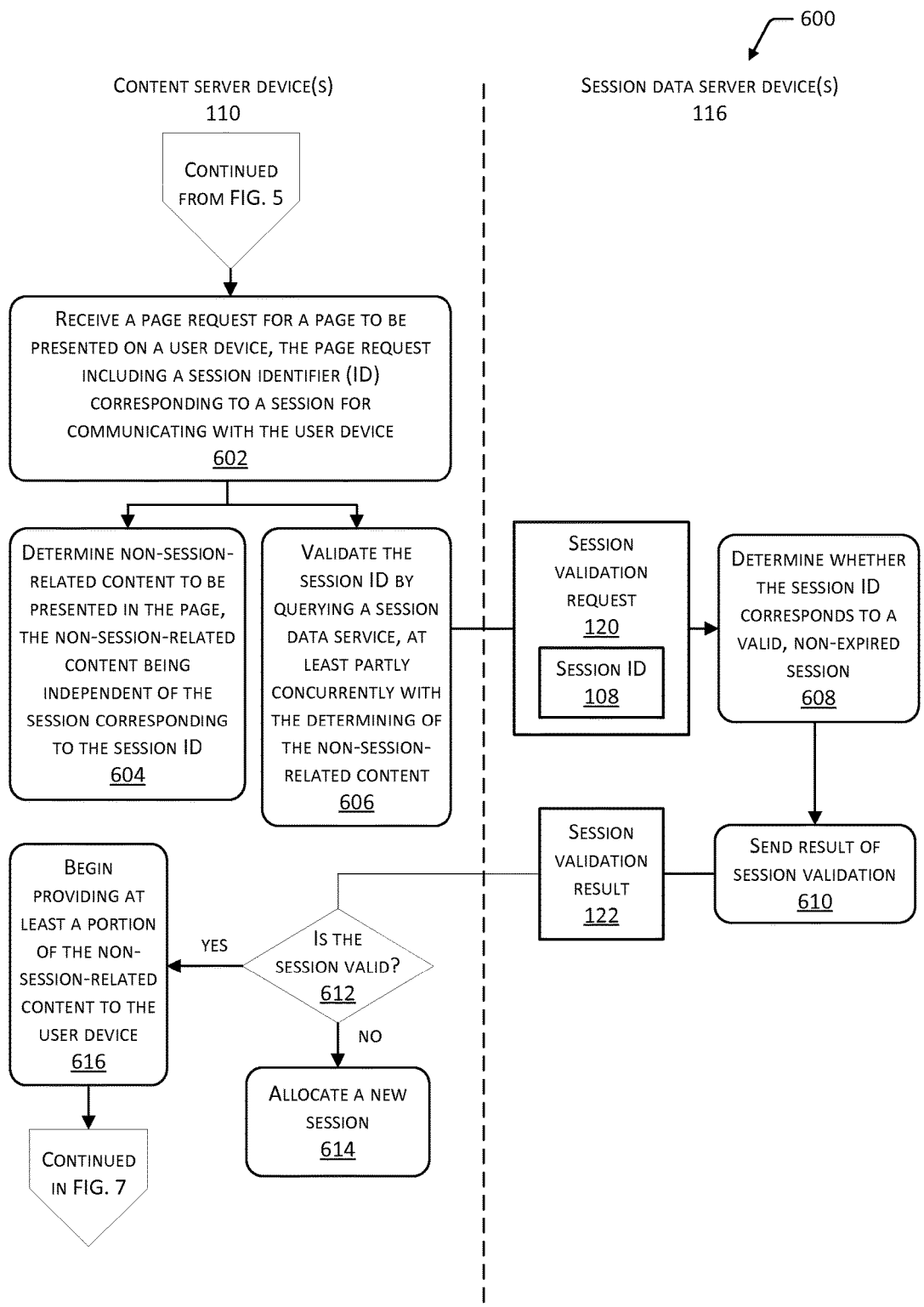
FIG. 6 depicts a flow diagram of a process including operations for validating a session identifier included in a page request, the operations being performed at least partly concurrently with operations to determine non-session-related content for the requested page.

FIG. 6 depicts a flow diagram 600 of a process including operations for validating the session ID 108 included in the page request 106, the operations being performed at least partly concurrently with operations to determine the non-session-related content 130 for the requested page 128. Operations of the process may be performed by the browser module 104 or other modules executing on the user device(s) 102. Operations of the process may be performed by the content service module 112, the content determination module 114, or other modules executing on the content server device(s) 110. Operations of the process may be performed by the session data service module 118 or other modules executing on the session data server device(s) 116. Operations of the process may also be performed by other modules of other devices.

At 602, the page request 106(2) is received from the user device 102 at the content server device 110, requesting the page 128(2) to be presented on the user device 102. As described above, the page request 106(2) may include the session ID 108 corresponding to a previously established session for communicating with the user device 102.

At 604, one or more operations may be started to determine the non-session-related content 130 to be presented in the requested page 128(2). As described above, the non-session-related content 130 includes content that is independent of a particular session corresponding to the session ID 108.

At 606, concurrently with the operation(s) to determine the non-session-related content 130, the session ID 108 may be validated. As described above, validation of the session ID 108 may include querying the session data service module 118 on the session data server device(s) 116. Accordingly, the session validation request 120 including the session ID 108 may be sent to the session data server device(s) 116 at 606.

At 608, the session data service module 118 may receive the session validation request 120, and determine whether the session ID 108 corresponds to a valid, non-expired session. A determination may be made that the session ID 108 corresponds to a valid session if there is session data 126 stored for the session ID 108 and if the current date/time is not later than the session data expiry date/time 418 associated with the session data 126 for the session ID 108. At 610, the session data service module 118 sends the session validation result 122 to the content server device 110 that sent the session validation request 120.

At 612, the session validation result 122 may be examined on the content server device 110, and a determination may be made whether the session ID 108 corresponds to a valid session. If the session is valid, processing may continue as described further with reference to FIG. 7. If the session is not valid, the process may proceed to 614. At 614, a new session ID 108 may be generated and allocated for a new session between the user device 102 and the content server device 110. The allocation of a new session ID 108 may proceed as described with reference to FIG. 5. The new session ID 108 may be incorporated into a HTTP cookie that is included in a header section of the page 128(2) to be provided in the response to the page request 106(2). Alternatively, the HTTP cookie may be included in a trailer section of the page 128(2). Because the content of the page 128(2), such as the non-session-related content 130 and the session-related content 132, may be included in the body section of the page 128(2), the generation of the new session ID 108 and its incorporation into the header or trailer may be performed prior to content determination operations. Alternatively, in response to determining that the session is not valid, the process may discontinue determining content to be provided with the page 128(2) and may discontinue processing to provide the page 128(2). In some cases, an error notification may be provided to the user device 102 indicating an invalid session.

Figure 10:
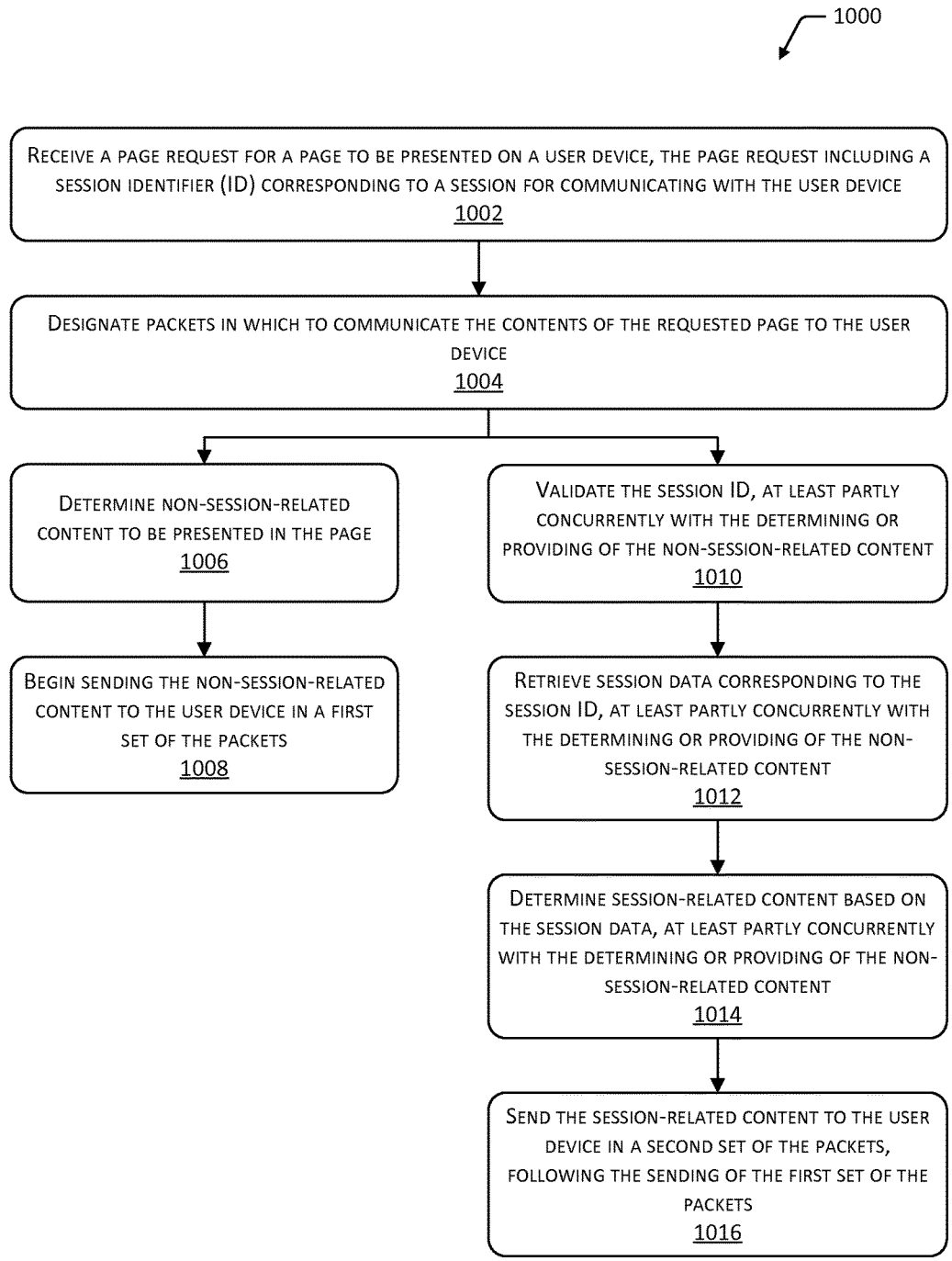
FIG. 10 depicts a flow diagram of a process for sending non-session-related content to a user device in a first set of packets that are sent to the user device, beginning prior to the sending of a second set of packets communicating session-related content to the user device.
Figure 11:
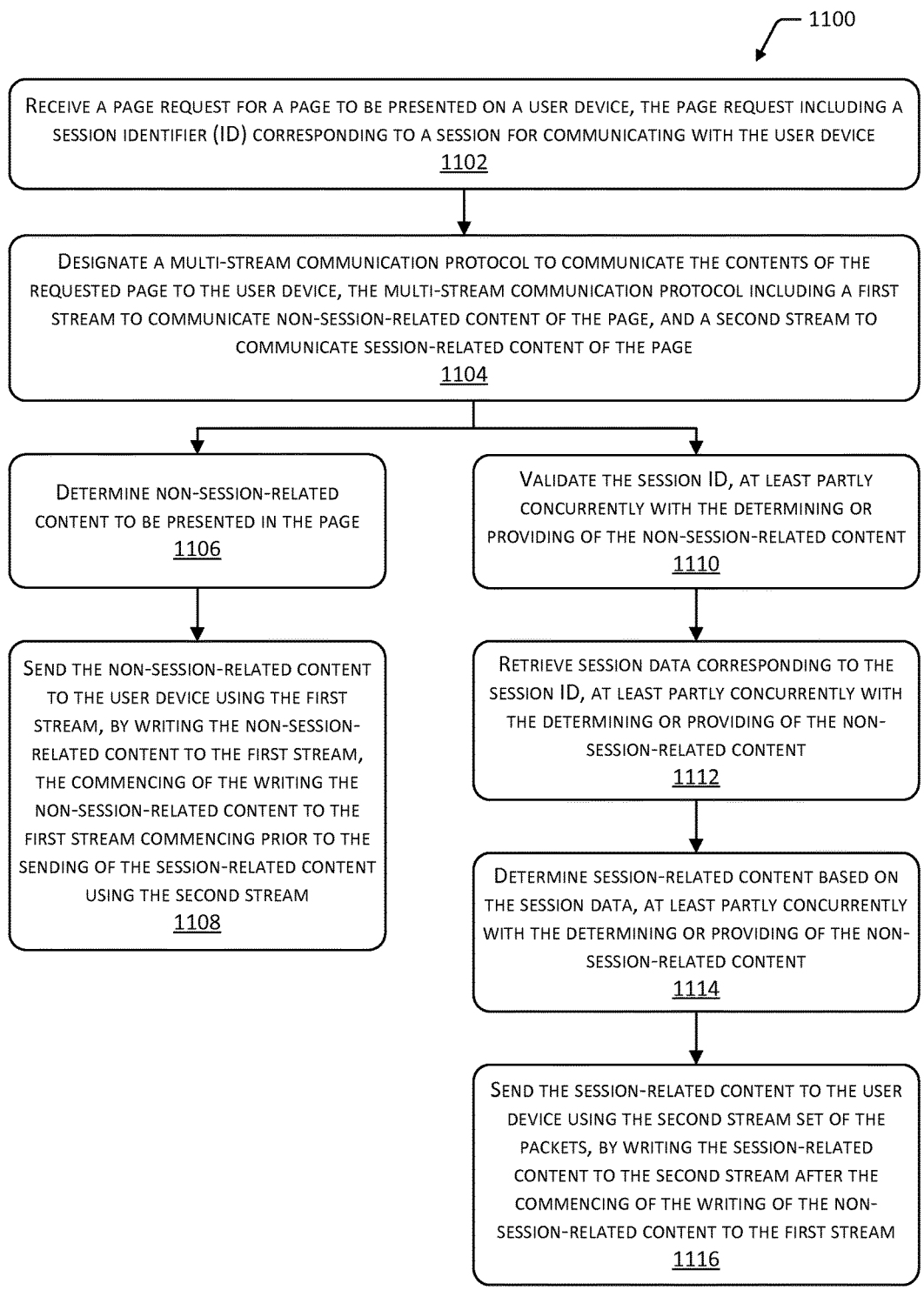
FIG. 11 depicts a flow diagram of a process for sending non-session-related content to a user device using a first stream of a multi-stream communication protocol, the first stream being written to prior to a second stream that communicates session-related content to the user device.
Figure 12:
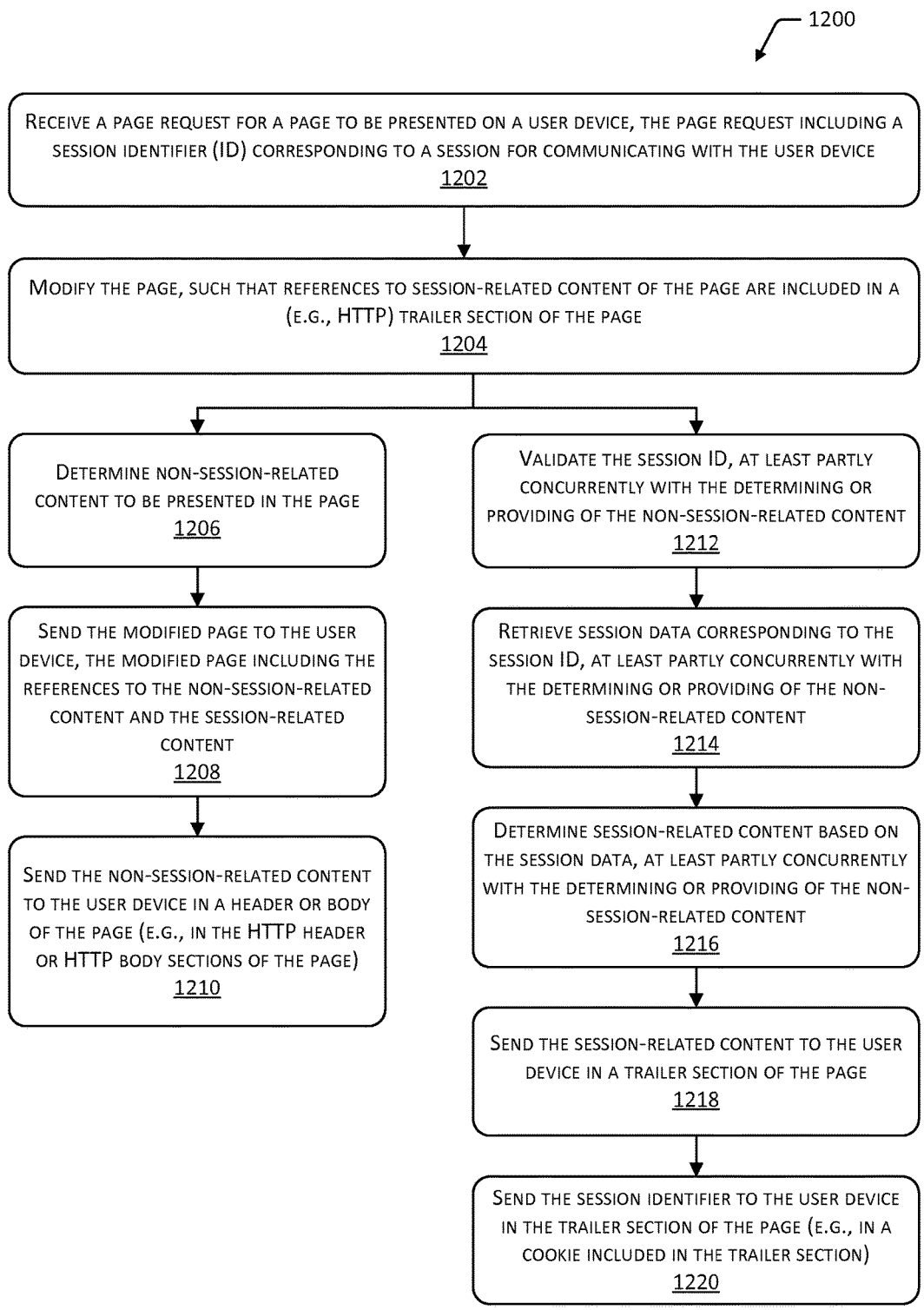
FIG. 12 depicts a flow diagram of a process for sending non-session-related content to a user device prior to session-related content, by including the session-related content in a trailer section of a page.

If it is determined that the session is valid at 612, in some implementations the process may begin providing (e.g., serving) to the user device 102 at least a portion of the non-session-related content 130 at 616 as the non-session-related content 130 is determined. The non-session-related content 130 may be provided in response to individual requests for items of the non-session-related content 130 from the user device 102. In some cases, the non-session-related content 130 may be provided to the user device 102 prior to, or concurrently with, the retrieval of the session data 126 and the determination of the session-related content 132 described with reference to FIG. 7. FIGS. 10-12 describe implementations which enable the sending of the non-session-related content 130 to begin prior to the sending of the session-related content 132.

In some implementations, on receiving the page request 106(2) that includes the session ID 108, the process may perform operations such as those described above to determine whether the user agent that sent the page request 106(2) is an automated process (e.g., a robot) employing a spoofed or otherwise invalid session ID 108 in its page request 106(2). Because such robot detection operations may incur latency (e.g., introduce delay), the process may serve a first (e.g., generic) version of the requested page 128 while the robot detection operations are being performed on the content server device(s) 110, the session data server device(s) 116, or elsewhere. If it is determined that the user agent is not a robot, a second (e.g., richer) version of the requested page 128 may then be provided to the user device 102. The second version of the requested page 128 may include the session-related content 132, determined as described with reference to FIG. 8. In some cases, the first (e.g., generic) version of the requested page 128 may be a static page that is predetermined and retrieved from content storage.

In some implementations, the content server device(s) 110 may determine a session-dependent version of the page 128 and a non-session-dependent version of the page 128, and may determine which version of the page 128 to serve to the user device 102 depending on the results of the session validation described above. In some cases, the non-session-dependent version of the page 128 may be a static page that is predetermined (e.g., predefined or pre-computed) and retrieved from content storage. The non-session-dependent version may also be dynamically generated. The generation or retrieval of the non-session-dependent version may be performed at least partly concurrently with the validation of the session ID 108. In some implementations, the non-session-dependent version of the page 128 may be configured to be sent to user agents that are automated processes (e.g., robots).

Figure 7:
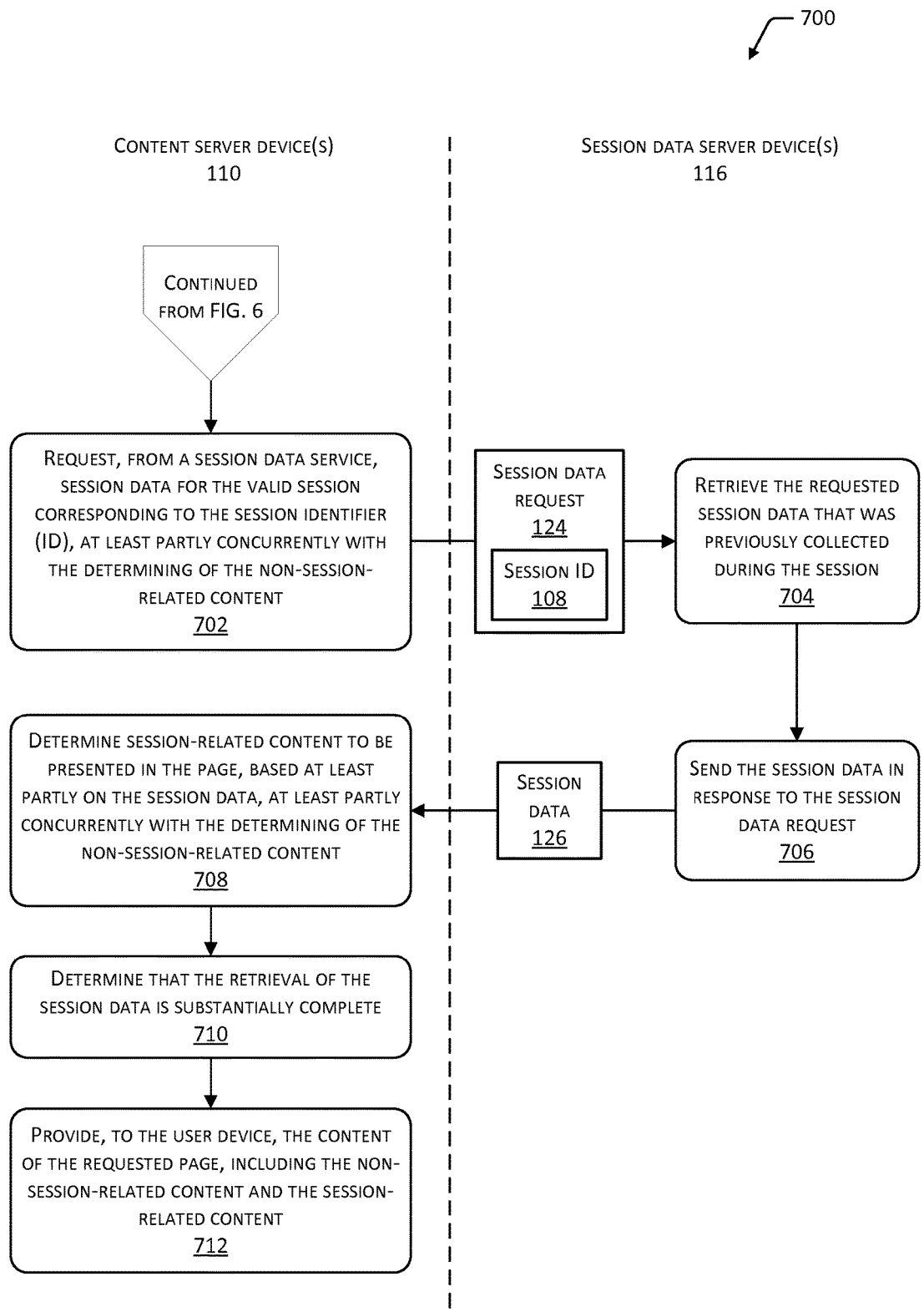
FIG. 7 depicts a flow diagram of a process including operations for retrieving session data and determining session-related content to include in a page, the operations being performed at least partly concurrently with operations to determine non-session-related content for the requested page.

FIG. 7 depicts a flow diagram 700 of a process including operations for retrieving the session data 126 and determining the session-related content 132 to include in the page 128, the operations being performed at least partly concurrently with operations to determine the non-session-related content 130 for the requested page 128. Operations of the process may be performed by the browser module 104 or other modules executing on the user device(s) 102. Operations of the process may be performed by the content service module 112, the content determination module 114, or other modules executing on the content server device(s) 110. Operations of the process may be performed by the session data service module 118 or other modules executing on the session data server device(s) 116. Operations of the process may also be performed by other modules of other devices.

At 702, following the determination of a valid session ID 108 at 612, one or more session data requests 124 may be sent to the session data service module 118, requesting the session data 126 corresponding to the session ID 108. In some cases, the determining of the non-session-related content 130 may continue in parallel with operations to retrieve the session data 126. In some cases, at least a portion of the non-session-related content 130 may be provided to the user device 102 in parallel with operations to retrieve the session data 126. Accordingly, the sending of the session data request 124 for the session data 126 may be performed at least partly concurrently with the determining of the non-session-related content 130. At 704, the session data service module 118 receives the session data request 124, including the session ID 108, and retrieves the requested session data 126 previously collected or generated during the session. At 706, the session data 126 is sent in response to the session data request 124.

In some implementations, the session data request 124 may request an entire set of the session data 126 that has been collected and stored during the session. Alternatively, the session data request 124 may request a subset of the session data 126 for a session. In some implementations, the session data 126 may be logically divided into individually requestable attributes, data records, or elements, and the one or more session data requests 124 may be sent to request one or more particular attributes, data records, or elements of the session data 126. For example, the session data request 124 may be sent to request the number of items that are currently in a shopping cart for a session, but may not request other information describing the products in the shopping cart. In some implementations, the content determination module 114 or another module may perform operations to predict which particular session attributes, data records, or elements are likely to be employed for generating the page 128, and those attributes may be proactively retrieved.

At 708, the requested session data 126 is received and one or more operations are started to determine the session-related content 132 based at least partly on the session data 126 as described above. In some cases, the determining of the non-session-related content 130 may continue in parallel with operations to determine the session-related content 132, such that the determination of the non-session-related content 130 may be at least partly concurrent with the determination of the session-related content 132. In some cases, at least a portion of the non-session-related content 130 may be provided to the user device 102 in parallel with operations to determine the session-related content 132.

At 710, a determination may be made that the retrieval of the session data 126 from the session data server device(s) 116 is substantially complete. Some implementations may ensure that the content included in the response to the page request 106(2) is held until session-related processing is complete, enabling the session ID 108 to be incorporated into the cookie headers for the page 128(2) or as part of the path for links in the content of the page 128(2). At 712, after completion of the generation of the non-session-related content 130 and the session-related content 132, the non-session-related content 130 and the session-related content 132 may be provided to the user device 102 for presentation in the browser module 104. The non-session-related content 130 provided at 712 may include at least the portion of the non-session-related content 130 that was not already provided beginning at 616. The page 128(2) may then be presented on the user device 102, the presentation including the non-session-related content 130 and the session-related content 132.

Figure 8:
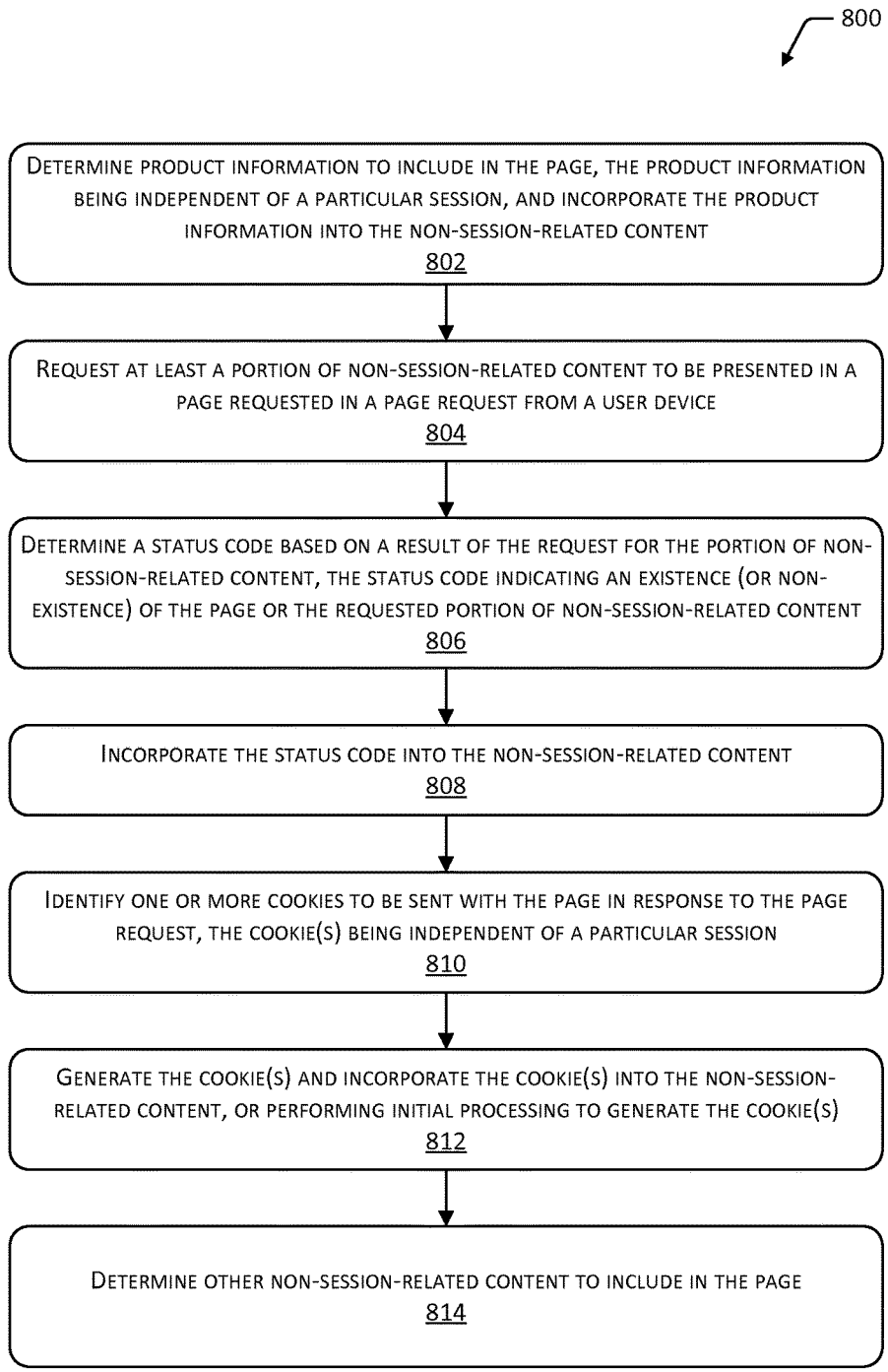
FIG. 8 depicts a flow diagram of a process for determining non-session-related content to include in a page.

FIG. 8 depicts a flow diagram 800 of a process for determining the non-session-related content 130 to include in the page 128. Operations of the process may be performed by the browser module 104 or other modules executing on the user device(s) 102. Operations of the process may be performed by the content service module 112, the content determination module 114, or other modules executing on the content server device(s) 110. Operations of the process may be performed by the session data service module 118 or other modules executing on the session data server device(s) 116. Operations of the process may also be performed by other modules of other devices.

As described above with reference to FIG. 2, in some cases the non-session-related content 130 may include product information 202, such as detail pages describing products or services available through an electronic commerce web site. Such product information 202 may be substantially independent of the particular user or user device 102 interacting with the web site, and may therefore be substantially independent of any particular session. At 802, product information 202 may be determined (e.g., dynamically generated or retrieved as static content), and the product information 202 may be loaded as non-session-related content 130 in the page 128.

At 804, at least a portion of other non-session-related content 130 may be requested, such as static non-session-related content 130 requested for retrieval from content storage.

At 806, one or more status codes may be determined based on the results of the request for the non-session-related content 130 at 804, or based on the results of requests for substantially static product information 202 at 802. Such status codes may indicate an existence (or non-existence) of the requested content. In some cases, the status codes may be HTTP status codes as described above with reference to FIG. 2. At 808, the status code(s) may be incorporated into the non-session-related content 130, e.g., as the status information 204.

As described above with reference to FIG. 2, in some cases the non-session-related content 130 may include one or more session-independent cookies 206. At 810, the session-independent cookie(s) 206 may be identified to be sent with the page 128 in response to the page request 106. At 812, the session-independent cookie(s) 206 may be generated and incorporated into the non-session-related content 130 of the page 128. Alternatively, initial processing may be performed that is preliminary to the generation of the session-independent cookie(s) 206. As described above with reference to FIG. 2, such initial processing may include one or more operations to determine whether a cookie is to be included in a response. Such operations may proceed without knowledge of any particular session or session data 126, even if the cookie itself may include session-related information. At 814, other types of the non-session-related content 130 may be determined for inclusion in the page 128.

Although FIG. 8 illustrates operations as being performed serially in an example order, implementations are not so limited. In some implementations, two or more of the operations shown in flow diagram 800 may be performed at least partly concurrently or in parallel. Moreover, implementations may support the performing of the operations in any order, and some implementations may omit, divide, or combine any of the operations shown.

Figure 9:
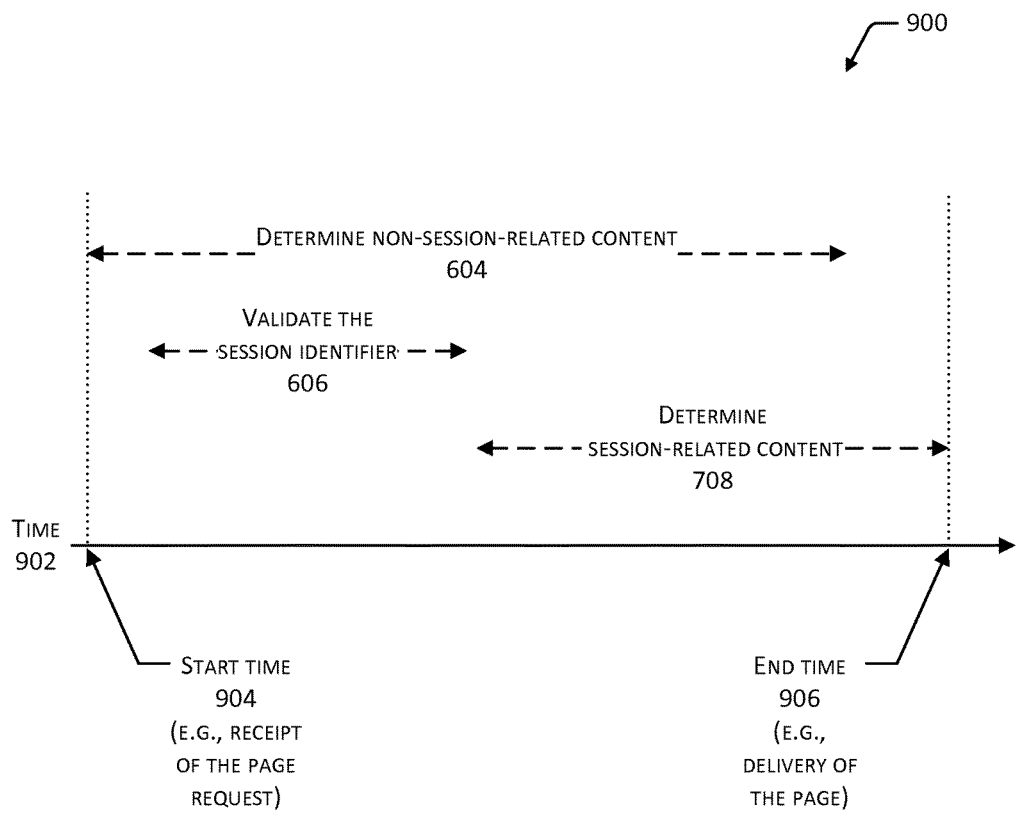
FIG. 9 depicts a timing diagram illustrating the determining of non-session-related content at least partly concurrently with validating a session identifier or determining session-related content.

FIG. 9 depicts a timing diagram 900 illustrating the determining of the non-session-related content 130 at least partly concurrently with validating the session ID 108 or determining the session-related content 132. The timing diagram 900 includes time 902 along a horizontal axis. During a time period between a start time 904 (e.g., a time when the page request 106 is received) and an end time 906 (e.g., a time when the page 128 is sent to the user device 102), processing may be performed to: determine the non-session-related content 130 (e.g., as described with reference to 604); validate the session ID 108 (e.g., as described with reference to 606, 608, 610, and 612); and determine the session-related content 132 (e.g., as described with reference to 702, 704, 706, and 708). As shown in the timing diagram 900, at least two of these processes may be performed concurrently such that they at least partly overlap in time.

Although the examples herein describe the validation of the session ID 108 and the retrieval of the session data 126 performed through separate operations, through the session validation request 120 that is separate from the session data request 124, implementations are not so limited. In some implementations, the session validation request 120 and the session data request 124 may be performed in a same request to the session data service module 118. For example, a session data request 124 may request at least a portion of the session data 126 associated with the session ID 108. A null response, error response, or another negative response from the session data service module 118 may indicate, to the requesting content server device 110, that the session ID 108 is not found, expired, or otherwise not associated with a valid session.

As described above with reference to 616, in some implementations the sending of the non-session-related content 130 to the user device 102 may begin prior to the sending of the session-related content 132. The sending of the non-session-related content 130 may be performed at least partly concurrently with the session-related processing to validate the session ID 108 and determine the session-related content 132. FIGS. 10-12 illustrate implementations that enable the sending of the non-session-related content 130 to begin prior to the sending of the session-related content 132.

FIG. 10 depicts a flow diagram 1000 of a process for sending the non-session-related content 130 to the user device 102 in a first set of packets that are sent prior to a second set of packets communicating the session-related content 132 to the user device 102. Operations of the process may be performed by the content service module 112, the content determination module 114, or other modules executing on the content server device(s) 110. Operations of the process may be performed by the session data service module 118 or other modules executing on the session data server device(s) 116. Operations of the process may also be performed by other modules of other devices.

In some implementations such as those illustrated in FIG. 10, the non-session-related content 130 may be sent to the user device 102 in a first set of one or more packets, and the session-related content 132 may be sent to the user device 102 in a second set of one or more packets. The sending of the first set of packets may begin prior to the sending of the second set of packets. A packet may include any amount of data arranged according to any protocol or format. In some cases, the packets may be sequenced and may have a sequence number based on an order in which they are communicated using a network. The packets may carry data at any layer of the Open Systems Interconnection (OSI) model or at any layer of the Internet Protocol Suite. For example, the packets may be Transmission Control Protocol (TCP) packets, Stream Control Transmission (SCT) packets, or packets arranged according to other protocols at the transport layer. The packets may also be Internet Protocol (IP) packets, or packets arranged according to other protocols at the network layer.

At 1002, the page request 106 may be received from the user device 102 at the content server device 110, the page request 106 including the session ID 108. Receiving the page request 106 may proceed as described above with reference to 602.

At 1004, a plurality of packets may be designated to be used for communicating the contents of the requested page 128 to the user device 102. A first set of the packets may be designated to communicate the non-session-related content 130, and a second set of the packets may be designated to communicate the session-related content 132. In some cases, the packets may be initially designated at 1004 such that the initial sequencing of the packets is independent of whether particular packets are to communicate the non-session-related content 130 or the session-related content 132.

At 1006, determination of the non-session-related content 130 of the page 128 may begin, as described above with reference to 604. At 1008, the non-session-related content 130 may begin to be sent to the user device 102 using the first set of packets that have been designated to communicate the non-session-related content 130. As described above, the determination and sending of the non-session-related content 130 may be performed at least partly concurrently with the session-related processing to validate the session ID 108 and determine the session-related content 132.

At 1010, the session ID 108 may be validated, as described above with reference to FIG. 6. At 1012, the session data 126 corresponding to the session ID 108 may be retrieved, as described above with reference to FIG. 7. At 1014, the session-related content 132 may be determined based at least partly on the session data 126, as described above with reference to FIG. 7. As described above, the validation of the session ID 108, retrieval of the session data 126, and determination of the session-related content 132 may be performed at least partly concurrently with the determination and sending of the non-session-related content 130.

At 1016, the session-related content 132 may be sent to the user device 102 using the second set of packets that have been designated to communicate the session-related content 132. Because the sending of the first set of packets may have begun while the session ID 108 was being validated, while the session data 126 was being retrieved, or while the session-related content 132 was being determined, the sending of the second set of packets may begin after the commencement of the sending of the first set of packets. In some cases, the entire first set of packets may be sent prior to the second set of packets. Alternatively, the sending of the first and second sets of packets may be interleaved in time, with at least one of the first set of packets being sent prior to at least one of the second set of packets.

In some implementations where the packets are TCP packets, a size of a TCP congestion window may be adjusted to ensure acceptance of the packets by the user device 102. A congestion window may be employed when using TCP to communicate information over a network, the congestion window being associated with a number of outstanding packets that communicating devices (e.g., the user device(s) 102 and the content server device(s) 110) may accept from each other. In some implementations, a TCP congestion window may be specified to be of a size that is large enough to accommodate the total number of packets in the first and second sets of packets. For example, in cases where the first set of packets includes five packets and the second set of packets includes four packets, the TCP congestion window may be set to a size corresponding to at least nine packets. Such a sizing of the TCP congestion window may ensure that the first set of packets is held in a buffer at the user device 102 and not dropped. Absent a large enough congestion window a network controller on the user device(s) 102 may infer, based on the received first set of packets being out of order in sequence number, that one or more of the second set of packets have been lost. Specifying a sufficiently large congestion window may ensure that the first set of packets is held in a buffer until the eventual receipt of the second set of packets.

FIG. 11 depicts a flow diagram 1100 of a process for sending the non-session-related content 130 to the user device 102 using a first stream of a multi-stream communication protocol, and sending the session-related content 132 to the user device 102 using a second stream of the multi-stream communication protocol. Operations of the process may be performed by the content service module 112, the content determination module 114, or other modules executing on the content server device(s) 110. Operations of the process may be performed by the session data service module 118 or other modules executing on the session data server device(s) 116. Operations of the process may also be performed by other modules of other devices.

Some implementations support the use of a multi-stream communication protocol to communicate the contents of the page 128 to the user device 102. Utilizing such a protocol, a plurality of content delivery streams may be delivered to the user device 102, through the multiplexing of a plurality of data streams. Such multiplexing may include the interleaving of data frames from the plurality of streams of concurrent streams across a single channel or connection, e.g., across a single TCP connection. In some cases, the multiplexing may be time-based multiplexing, such that the data frames from the plurality of streams are interleaved in time. By multiplexing multiple streams, the multi-stream communication protocol may reduce latency in communications, and may efficiently deliver information such as web content over a single connection to the user device 102. The multi-stream communication protocol may operate at the application layer, session layer, or any other layer of the OSI model. In some implementations the multi-stream communication protocol may be any version of SPDY™, developed primarily at Google® Inc. of Mountain View, Calif., USA. Implementations support the use of any multi-stream communication protocol that multiplexes data from multiple streams, and that operates at any level of the OSI model.

At 1102, the page request 106 may be received from the user device 102 at the content server device 110, the page request 106 including the session ID 108. Receiving the page request 106 may proceed as described above with reference to 602.

At 1104, a connection may be designated that employs a multi-stream communication protocol to communicate the contents of the requested page 128 to the user device 102. One or more first streams of the protocol may be designated to communicate the non-session-related content 130, and one or more second streams of the protocol may be designated to communicate the session-related content 132.

At 1106, determination of the non-session-related content 130 of the page 128 may begin, as described above with reference to 604. At 1108, the non-session-related content 130 may begin to be sent to the user device 102 by writing the non-session-related content 130 to the designated first stream. As described above, the determination and sending of the non-session-related content 130 may be performed at least partly concurrently with the session-related processing to validate the session ID 108 and determine the session-related content 132.

At 1110, the session ID 108 may be validated, as described above with reference to FIG. 6. At 1112, the session data 126 corresponding to the session ID 108 may be retrieved, as described above with reference to FIG. 7. At 1114, the session-related content 132 may be determined based at least partly on the session data 126, as described above with reference to FIG. 7. As described above, the validation of the session ID 108, retrieval of the session data 126, and determination of the session-related content 132 may be performed at least partly concurrently with the determination and sending of the non-session-related content 130.

At 1116, the session-related content 132 may begin to be sent to the user device 102 by writing the session-related content 132 to the designated second stream. The writing of the non-session-related content 130 to the first stream, and the sending of the non-session-related content 130, may have begun while the session ID 108 was being validated, while the session data 126 was being retrieved, or while the session-related content 132 was being determined. Accordingly, the writing of the session-related content 132, and its delivery to the user device 102, may begin after the commencement of the sending of the non-session-related content 130. In some cases, the sending of the non-session-related content 130 may be substantially complete before the start of the sending of the session-related content 132. Alternatively, the sending of the non-session-related content 130 and the session-related content 132 may at least partly overlap in time.

FIG. 12 depicts a flow diagram 1200 of a process for sending the non-session-related content 130 to the user device 102 prior to the session-related content 132, by including references to the session-related content 132 in a trailer section of the source code of the page 128. Operations of the process may be performed by the content service module 112, the content determination module 114, or other modules executing on the content server device(s) 110. Operations of the process may be performed by the session data service module 118 or other modules executing on the session data server device(s) 116. Operations of the process may also be performed by other modules of other devices.

At 1202, the page request 106 may be received from the user device 102 at the content server device 110, the page request 106 including the session ID 108. Receiving the page request 106 may proceed as described above with reference to 602.

At 1204, the source of the requested page 128 may be modified to include one or more references to the session-related content 132 in the HTTP trailer section of the page 128, to ensure that the session-related content 132 to be communicated to the user device 102 after the non-session-related content 130. The modification of the source at 1204 may include modifying the HTTP header section to include a specification of what content items are to be expected in the trailer section. The trailer section, header section, and body section of the page 128 may be identified based on HTML tags or other metadata elements that indicate the beginning and end of such sections.

In some implementations, the process may check the type or version of the browser module 104 that sent the page request 106, and may check which version of HTTP is supported by the browser module 104, to determine whether the browser module 104 supports the use of HTTP trailers. The browser module 104 may be determined to support trailers if it supports HTTP version 1.1 or higher. Trailers may be employed in cases where the content of the page 128 is being delivered using a multi-stream communication protocol such as SPDY™, as described above. If the requestor does not support trailers, the process may not modify the source of the page 128. In some cases the references to the session-related content 132 may be URIs included in the source, and modification of the source may include moving such URIs from an initial location in the source (e.g., in the header section or body section) to the trailer section.

At 1206, determination of the non-session-related content 130 of the page 128 may begin, as described above with reference to 604. At 1208, the modified source of the page 128 may be sent to the user device 102. Because the references to the non-session-related content 130 may be included in the header or body section of the page 128, the browser module 104 may send begin requesting the non-session-related content 130 after receipt of the page 128. At 1210, the non-session-related content 130 may begin to be sent to the user device 102 in response to such requests. As described above, the determination and sending of the non-session-related content 130 may be performed at least partly concurrently with the session-related processing to validate the session ID 108 and determine the session-related content 132.

At 1212, the session ID 108 may be validated, as described above with reference to FIG. 6. At 1214, the session data 126 corresponding to the session ID 108 may be retrieved, as described above with reference to FIG. 7. At 1216, the session-related content 132 may be determined based at least partly on the session data 126, as described above with reference to FIG. 7. As described above, the validation of the session ID 108, retrieval of the session data 126, and determination of the session-related content 132 may be performed at least partly concurrently with the determination and sending of the non-session-related content 130.

At 1218, the session-related content 132 may begin to be sent to the user device 102. Because references to the session-related content 132 may be included in the trailer section of the modified source of the page 128, the browser module 104 may request the session-related content 132 after its requests for the non-session-related content 132. Accordingly, referencing the session-related content 132 in the trailer section may enable the session-related content 132 to be communicated to the user device 102 after the communication of the non-session-related content 130. Such an ordering of the content references may provide time for the session-related processing to be performed while the non-session-related content 130 is being communicated to the user device 102.

Implementations support the providing of any type of the session-related content 132 in the trailer section of the page 128. Implementations also support the use of the trailer section to deliver any information that may not impact that presentation of the page 128. For example, in cases where cookies are to be generated to include the session ID 108, at 1220 one or more such cookies may be sent to the user device 102 in the trailer section of the page 128. Implementations support the use of the trailer section to send the session ID 108 or any other session-related information that may otherwise be sent in the header section of the page 128. The trailer section may also include other types of information not related to a presentation of the currently presented page 128, such as link headers to related pages, pre-fetch hints to subsequently requested pages, and so forth.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in one or more computer-readable storage media as instructions executable on one or more processors.

Embodiments may be provided as one or more computer program products that include one or more non-transitory computer readable storage media having stored thereon instructions (in compressed or uncompressed form) that may be used to program a computer (or other electronic device) to perform processes or methods described herein. The one or more computer readable storage media may include, but are not limited to, one or more of an electronic storage medium, a magnetic storage medium, an optical storage medium, a quantum storage medium, or a mechanical data storage medium. For example, the one or more computer readable storage media may include, but are not limited to, hard drives, floppy diskettes, optical disks, ROMs, RAMs, EPROMs, EEPROMs, flash memory, magnetic cards, optical cards, solid-state memory devices, or other types of physical media suitable for storing electronic instructions. Further, embodiments may also be provided as one or more computer program products including one or more transitory machine-readable signals in a compressed or an uncompressed form. Such machine-readable signals may or may not be modulated using a carrier. Examples of the machine-readable signals include, but are not limited to, signals that a computing system or other machine hosting or running a computer program may be configured to access. Machine-readable signals may include signals transmitted over one or more networks. For example, a transitory machine-readable signal may comprise transmission of software over a network such as the Internet.

Separate instances of these programs may be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method, comprising:
receiving a request for a web page to be presented on a user device, the request including a session identifier corresponding to a Hypertext Transfer Protocol (HTTP) session for communicating with the user device;
validating the session identifier, including querying a session data service to determine whether the HTTP session is a valid HTTP session that was previously established for communicating with the user device;
requesting, from the session data service, session data corresponding to the session identifier, the session data having been previously collected during the HTTP session and stored by the session data service;
determining non-session-related content to be presented in the web page, the determining of the non-session-related content being at least partly concurrent with the validating of the session identifier and the requesting of the session data, the non-session-related content being independent of the HTTP session corresponding to the session identifier;
determining session-related content to be presented in the web page, the session-related content based at least partly on the session data; and
sending, to the user device, the session-related content and the non-session-related content in at least one response to the request for the web page.

2. The method of claim 1, wherein:
the sending of the non-session-related content includes sending the non-session-related content to the user device in a first set of Transmission Control Protocol (TCP) packets;
the sending of the session-related content includes sending the session-related content to the user device in a second set of TCP packets; and
the sending of the first set of TCP packets begins prior to the sending of the second set of TCP packets.

3. The method of claim 1, wherein:
the sending of the non-session-related content includes sending the non-session-related content to the user device in a first stream of a connection that employs a multi-stream communication protocol;
the sending of the session-related content includes sending the session-related content to the user device in a second stream of the connection that employs the multi-stream communication protocol; and
the sending of the non-session-related content in the first stream begins prior to the sending of the session-related content in the second stream.

4. A system, comprising:
at least one computing device configured to implement one or more services, wherein the one or more services are configured to:
receive a request for a page to be presented on a user device, the request including a session identifier corresponding to a session for communicating with the user device;
retrieve, from a session data service, session data corresponding to the session identifier, the session data having been previously collected during the session and stored by the session data service;
determine non-session-related content to be presented in the page, the determining of the non-session-related content being at least partly concurrent with the retrieving of the session data, the non-session-related content being independent of the session corresponding to the session identifier; and
cause the non-session-related content and session-related content to be sent to the user device to be presented in the page, the session-related content based at least partly on the session data.

5. The system of claim 4, the one or more services further configured to:
validate the session identifier, including querying the session data service to determine whether the session is a valid session that was previously established for communicating with the user device, the validating of the session identifier being at least partly concurrent with the determining of the non-session-related content.

6. The system of claim 5, wherein the sending of the non-session-related content begins after the validating of the session identifier.

7. The system of claim 4, wherein the sending of the non-session-related content to the user device begins prior to the providing of the session-related content, based on one or more references to the session-related content being included in a Hypertext Transfer Protocol (HTTP) trailer section of the page.

8. The system of claim 4, wherein the non-session-related content includes a status code that indicates a status of the page specified in the request.

9. The system of claim 4, wherein:
the session is a Hypertext Transfer Protocol (HTTP) session;
the non-session-related content includes a cookie; and
the determining of the non-session-related content further comprises generating the cookie at least partly concurrently with the retrieving of the session data.

10. The system of claim 4, wherein:
the sending of the non-session-related content includes sending the non-session-related content to the user device in a first set of packets;
the sending of the session-related content includes sending the session-related content to the user device in a second set of packets; and
the sending of the first set of packets begins prior to the sending of the second set of packets.

11. The system of claim 4, wherein:
the sending of the non-session-related content includes sending the non-session-related content to the user device in a first stream of a connection that employs a multi-stream communication protocol;
the sending of the session-related content includes sending the session-related content to the user device in a second stream of the connection that employs the multi-stream communication protocol; and
the sending of the non-session-related content in the first stream begins prior to the sending of the session-related content in the second stream.

12. One or more non-transitory computer-readable media storing which, when executed by at least one processor, instruct the at least one processor to perform actions comprising:
based at least partly on a request for a page to be presented on a user device, modifying source code of the page to reference session-related content of the page in a Hypertext Transfer Protocol (HTTP) trailer section of the page, the request including a session identifier corresponding to a HTTP session for communicating with the user device, the page including:
non-session-related content that is independent of the HTTP session; and
the session-related content that is based at least partly on the HTTP session;
determining the non-session-related content at least partly concurrently with determining the session-related content, the determining of the session-related content based at least partly on session data collected during the HTTP session; and
causing the non-session-related content to be sent to the user device prior to the session-related content, based at least partly on the session-related content being referenced in the HTTP trailer section of the page.

13. The one or more non-transitory computer-readable media of claim 12, wherein the sending of the non-session-related content is at least partly concurrent with the determining of the session-related content.

14. The one or more non-transitory computer-readable media of claim 13, the actions further comprising:
validating the session identifier, including querying an external session data service to determine whether the HTTP session is a valid HTTP session that was previously established for communicating with the user device, the validating of the session identifier being at least partly concurrent with the determining of the non-session-related content.

15. The one or more non-transitory computer-readable media of claim 12, wherein the providing of the non-session-related content begins after the validating of the session identifier.

16. The one or more non-transitory computer-readable media of claim 12, wherein the sending of the non-session-related content to the user device is delayed until the retrieving of the session data is substantially complete.

17. The one or more non-transitory computer-readable media of claim 12, wherein the non-session-related content includes a status code that indicates a status of the page specified in the request.

18. The one or more non-transitory computer-readable media of claim 12, the actions further comprising:
sending, to the user device, a response to the request for the page, the response including the session identifier in a HTTP cookie included the HTTP trailer section of the page.

19. The system of claim 4, wherein the one or more services are further configured to:
determine that the request is not associated with an automated process, wherein the retrieving of the session data is performed based at least in part on the determination that the request is not associated with the automated process;
the determining of the non-session-related content being at least partly concurrent with the determining that the request is not associated with the automated process.

20. The system of claim 4, wherein the one or more services are further configured to:
determine that the request is not associated with an automated process, wherein the retrieving of the session data is performed based at least in part on the determination that the request is not associated with the automated process; and
providing a generic version of the page based at least partly on the non-session-related content to the user device, the providing the generic version of the page being at least partly concurrent with the determining that the request is not associated with the automated process.

* * * * *